(12) United States Patent
Lacroix et al.

(10) Patent No.: US 11,975,769 B2
(45) Date of Patent: May 7, 2024

(54) AERODYNAMIC APPARATUSES FOR TRAILER

(71) Applicant: TRANSTEX INC., Montréal (CA)

(72) Inventors: Pierre-Yves Lacroix, Laval (CA);
Jacques Leclerc, Pierrefonds (CA);
Alexandre Derny, Roxboro (CA);
Mathieu Boivin, Mont-Royal (CA)

(73) Assignee: Transtex Inc., Saint Laurent (CA)

( * ) Notice: Subject to any disclaimer, the term of this patent is extended or adjusted under 35 U.S.C. 154(b) by 153 days.

(21) Appl. No.: 17/532,892

(22) Filed: Nov. 22, 2021

(65) Prior Publication Data
US 2023/0159113 A1    May 25, 2023

(51) Int. Cl.
*B62D 35/00* (2006.01)
(52) U.S. Cl.
CPC .................................. *B62D 35/001* (2013.01)
(58) Field of Classification Search
CPC ........ B62D 35/001; B62D 25/07; B60R 13/07
See application file for complete search history.

(56) References Cited

U.S. PATENT DOCUMENTS

| 8,251,436 B2 | 8/2012 | Henderson et al. |
| 8,783,757 B2 | 7/2014 | Henderson et al. |
| 9,327,780 B1 * | 5/2016 | Bird ..................... B60R 19/023 |

FOREIGN PATENT DOCUMENTS

| CA | 2936659 A1 * | 7/2015 | ................ A61F 2/15 |
| CA | 2961392 A1 * | 9/2017 | ........... B62D 35/001 |
| CN | 108698054 A * | 10/2018 | ................ B05B 1/14 |
| FR | 3087182 | 4/2020 | |
| WO | 2018200007 | 11/2018 | |
| WO | WO-2018200007 A1 * | 11/2018 | ........... B62D 35/001 |
| WO | 2019199323 | 10/2019 | |
| WO | WO-2019199323 A1 * | 10/2019 | ........... B62D 35/001 |

* cited by examiner

*Primary Examiner* — Lori Lyjak
(74) *Attorney, Agent, or Firm* — Benoit & Cote Inc.; Mathieu Audet

(57) ABSTRACT

There is described a top fairing for a trailer adapted to decrease drag and manage water. The top fairing comprises a surface for guiding air thereover, comprising a leading flange; a leading surface having a leading radius, the leading surface being joined to the leading flange and extending in a rearward direction; and a tailing surface having a tailing radius, the tailing surface in continuity to the leading surface in the rearward direction. The top fairing comprises openings disposed in the leading flange for managing water through the leading flange.

19 Claims, 12 Drawing Sheets

AERODYNAMIC APPARATUSES FOR TRAILER

BACKGROUND

(a) Field

The subject matter of the present invention relates to an end of trailer fairing that improves aerodynamic performance of the trailer. More particularly, the present application involves fairing that features a specific geometric shape that includes a leading curved portion and a trailing curved portion that meets at a point of tangency. Improvements for water management are also part of the present application.

(b) Related Prior Art

Trailers towed by trucks and similar apparatuses for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retrofitted with trailer skirts (or side skirts), devices affixed to the underside which limit air circulating in the empty space between the trailer's axles. By reducing the amount of airflow in this space, drag caused by turbulence is reduced and permits the trailer to be towed more efficiently, increasing the gas mileage and performance of the vehicle and its cargo. Other ways of improving aerodynamic performance of the trailer involves the provision of fairings to the end of the trailer. The fairings modify the airflow around or off of the end of the trailer to reduce drag. It is known to produce fairings that have a curved outer surface that extend from the leading edge of the fairing to the tailing edge of the fairing. These curved fairings change the airflow about the end of the trailer to reduce dragging force. Although capable of reducing some dragging force at the end of the trailer, additional fairing designs that can stabilize the airflow wake structure behind the trailer are desirable. As such, there remains room for variation and improvement within the art.

Furthermore, the existing top fairings present problems in relation with rain management. The shape of the existing top fairings prevents water to travel along the top surface of the trailers, to reach the rain gutters located at the rear edge of the top surface of the trailers for the rain to be drained without being projected to following vehicles. Therefore, nowadays, owners must select between in improvement to the drag of the trailer trough a top fairing or having a rain gutter for managing water on top of the trailer. There is therefore need for improvement with that respect.

Furthermore, with the presence of trailers having corrugations on the side, there is a need for an improvement in the side fairings being able to better marry the side surface and guide air along the side surface of the trailer toward the rear of the trailer, and that without a portion of the air getting under the side fairings, or having complicated solution in term of installation or of construction of the side fairings.

SUMMARY

In some aspects, the techniques described herein relate to a top fairing for a trailer, or a box truck (cube) including a boxed cargo space without departing from the scope of the present application, including: a surface for guiding air thereover, including a flange; a leading surface having a leading radius, the leading surface being joined to the flange and extending in a rearward direction; and a tailing surface having a tailing radius, the tailing surface in continuity to the leading surface in the rearward direction; and openings disposed in the flange for managing water through the flange.

In some aspects, the techniques described herein relate to a top fairing, wherein the flange and the leading surface are joining each other with a root angle of between 8 degrees and 22 degrees, more precisely about 20.7 degrees.

In some aspects, the techniques described herein relate to a top fairing, wherein the flange is a serrated flange.

In some aspects, the techniques described herein relate to a top fairing, wherein the flange has a depth perpendicular to its longitudinal orientation, and wherein the openings have funnel-shape walls extending through full depth of the flange.

In some aspects, the techniques described herein relate to a top fairing, wherein the openings extend into the leading surface.

In some aspects, the techniques described herein relate to a top fairing, wherein flange has a thickness, and the openings have a height greater than the flange.

In some aspects, the techniques described herein relate to a top fairing, wherein the tailing surface includes a cantilever portion.

In some aspects, the techniques described herein relate to a top fairing, including a support structure, and wherein the cantilever portion is rearward from the support structure.

In some aspects, the techniques described herein relate to a top fairing, wherein the top fairing includes a bridge portion frontward from the cantilever portion, wherein the bridge portion has clearance under while providing support to the tailing surface.

In some aspects, the techniques described herein relate to a top fairing, further includes side walls including a bar opening and a slot, a bar extending through the side walls, and a pair of brackets to be mounted to a top surface of the trailer, each one of the brackets being adapted to be secured to an extremity of the bar and including a wing interfacing with the slot distant from the bar to secure the top fairing against rotation.

In some aspects, the techniques described herein relate to a top fairing, wherein the brackets are adapted to be secured to corner members of the trailer.

In some aspects, the techniques described herein relate to a top fairing, wherein the bar has a transversal coordinate according to its axis, wherein the top fairing has a chord length measured from a leading edge of the leading surface to a tailing edge of the tailing surface, wherein the leading surface and the tailing surface join with each other at a meeting location, and wherein transversal coordinates of the meeting location and of the bar are within 10% of the chord length from each other.

In some aspects, the techniques described herein relate to a top fairing, wherein the top fairing has a chord measured from a leading edge of the leading surface to a tailing edge of the tailing surface, wherein the leading surface and the tailing surface join with each other at a meeting location, and wherein transversal coordinates of center of curvature of the leading radius, of center of curvature of the tailing radius and of meeting location are within 20% of the chord length from each other.

In some aspects, the techniques described herein relate to trailer with fairing including a fairing adapted to manage water.

In some aspects, the techniques described herein relate to a trailer with fairing, wherein the fairing includes side fairing mounted to side surfaces of the trailer.

In some aspects, the techniques described herein relate to a trailer with fairing, wherein the side surfaces include corrugations, and wherein each one of the side fairings includes a side-fairing flange, a side-fairing leading surface, and notches extending into the side-fairing flange and the side fairing leading surface, wherein the notches provide clearance for the corrugations to fill when the flange abuts the side surface of the trailer.

In some aspects, the techniques described herein relate to a fairing kit for decreasing drag, and a pair of top-fairing brackets adapted to mount the top fairing to a top surface of the trailer.

In some aspects, the techniques described herein relate to a fairing kit, further including side fairings and side-fairing brackets adapted to mount the side fairings to side surfaces of the trailer.

In some aspects, the techniques described herein relate to a fairing kit, wherein the side fairing brackets include a surface-contacting portion adapted to abut the side surfaces, and a fairing-mounting portion adapted for the side fairings to be mounted thereto, wherein the fairing mounting portion is adapted to be distant from the side surfaces.

In some aspects, the techniques described herein relate to a top fairing for a trailer including: a surface for guiding air thereover, including a flange; a leading surface having a leading radius, the leading surface being joined to the flange and extending in a rearward direction with a root angle between the flange and the leading surface of between 8 degrees and 22 degrees, more precisely about 20.7 degrees; and a tailing surface having a tailing radius, the tailing surface in continuity to the leading surface in the rearward direction, wherein the top fairing includes essentially the flange, the leading surface and the tailing surface in continuity to each according to essentially two radii for guiding air thereover.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

Figure 1:
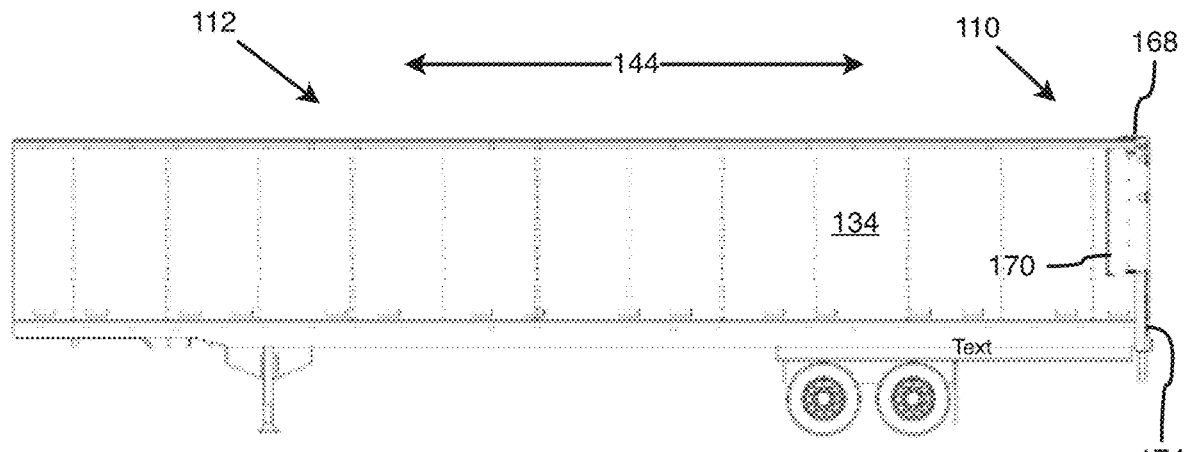
FIG. 1 is a side view of a trailer with fairings mounted thereto.

The terms "top", "up", "upper", "bottom", "lower", "down", "vertical", "horizontal", "interior" and "exterior" and the like are intended to be construed in their normal meaning in relation with normal installation of the product, with normal orientation of the components being depicted on FIG. 1.

Figure 2:
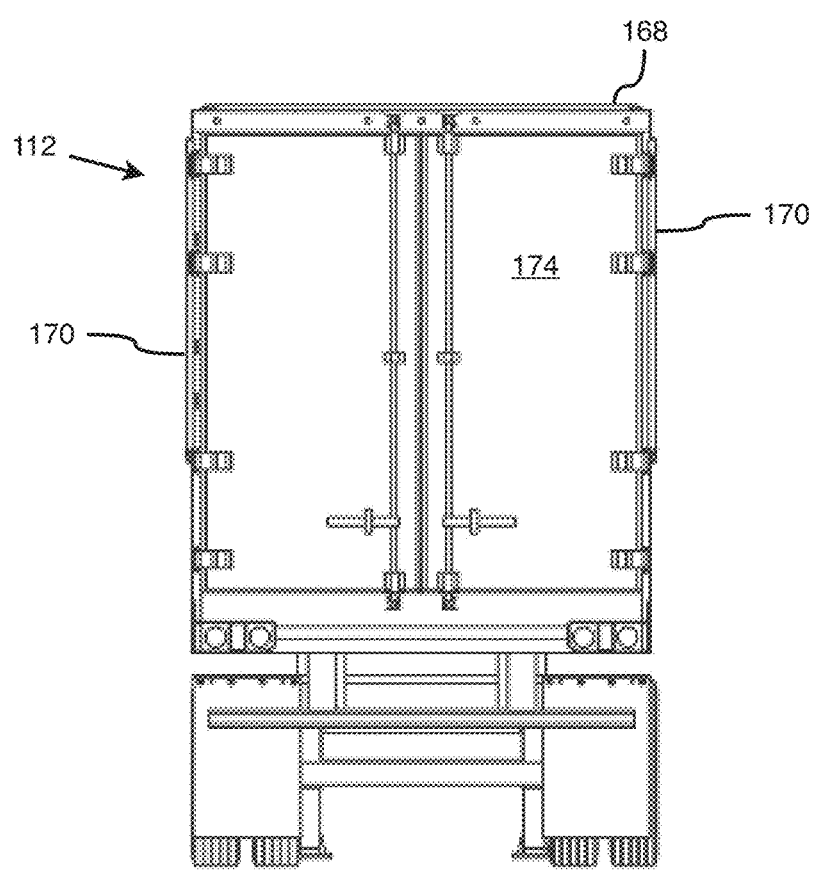
FIG. 2, is a rear view of the trailer of FIG. 1.
Figure 3:
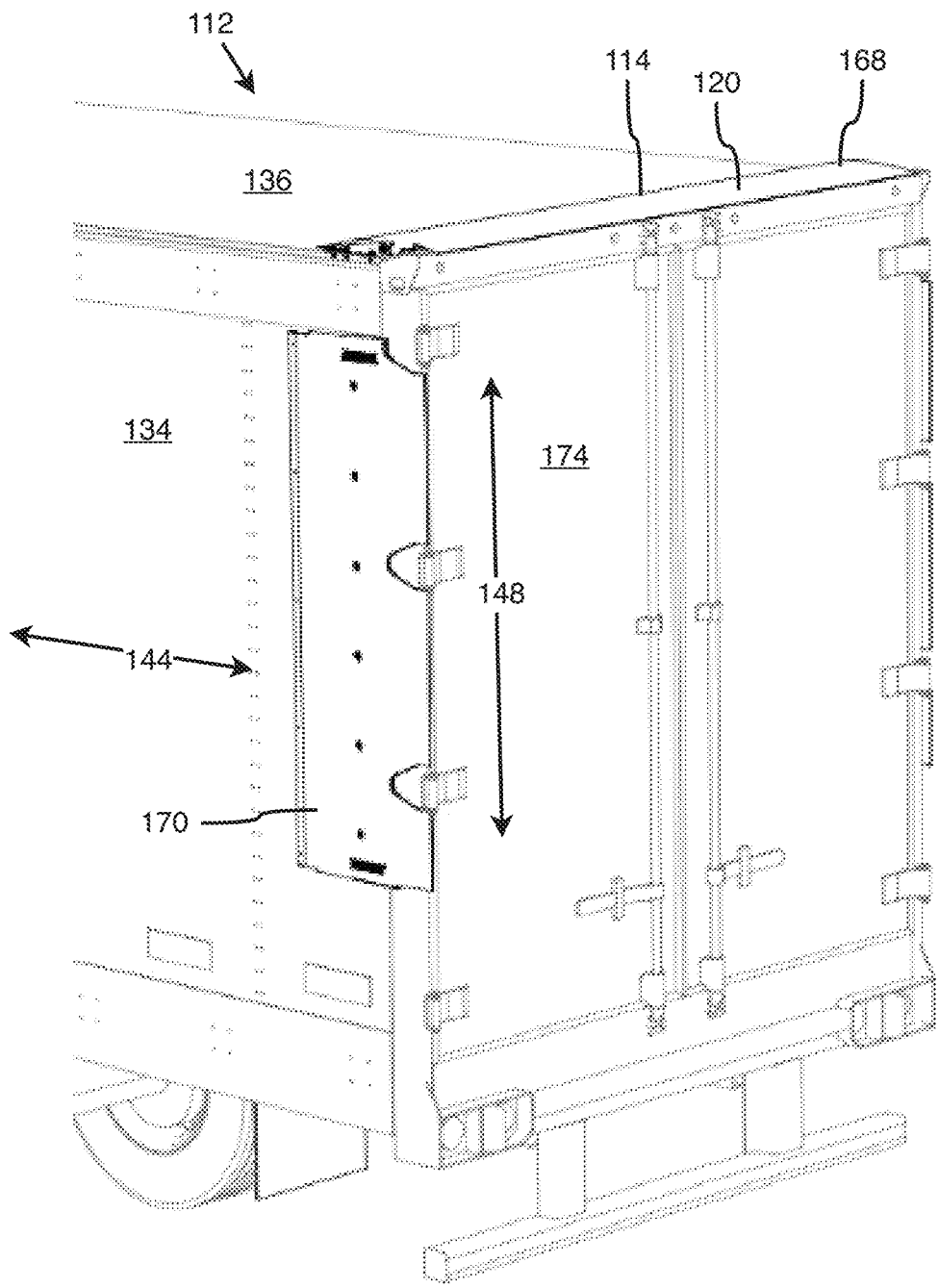
FIG. 3 is a perspective view of the rear portion of the trailer of FIG. 1.
Figure 4:
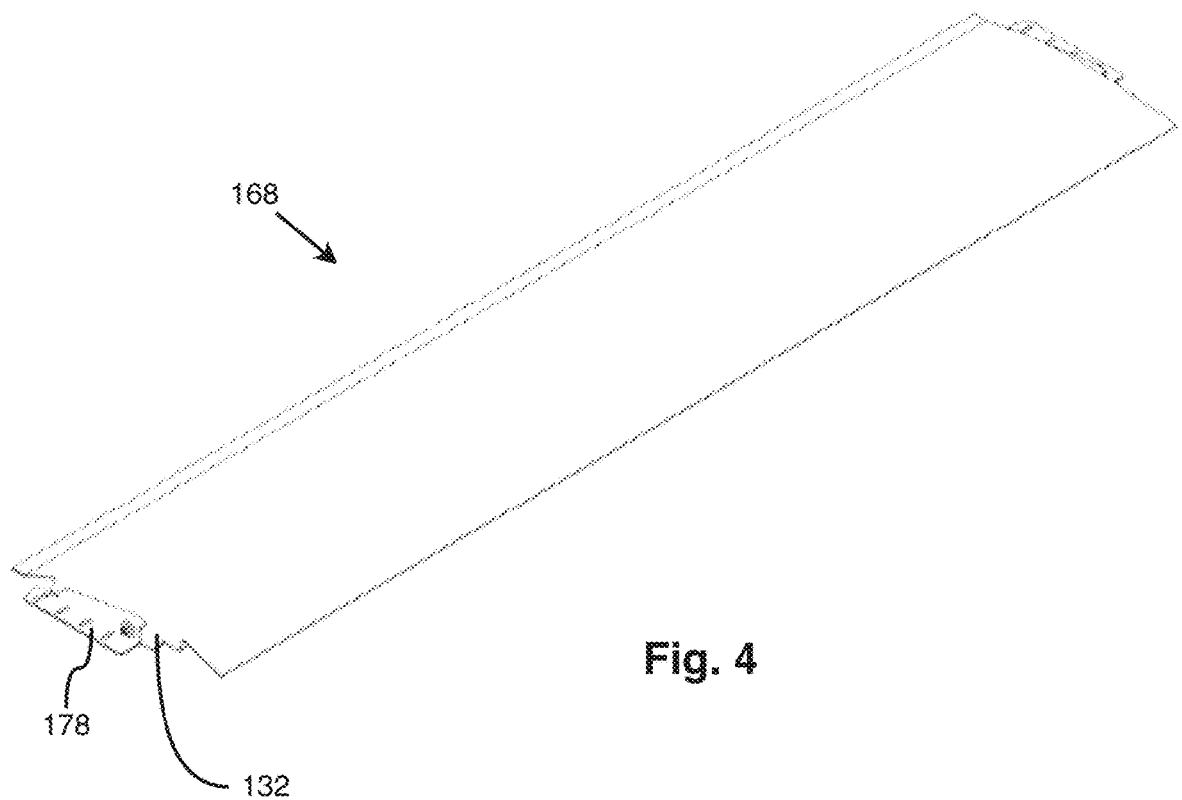
FIG. 4 is a perspective view of a top fairing with a bracket assembled therewith in accordance with an embodiment.
Figure 5:
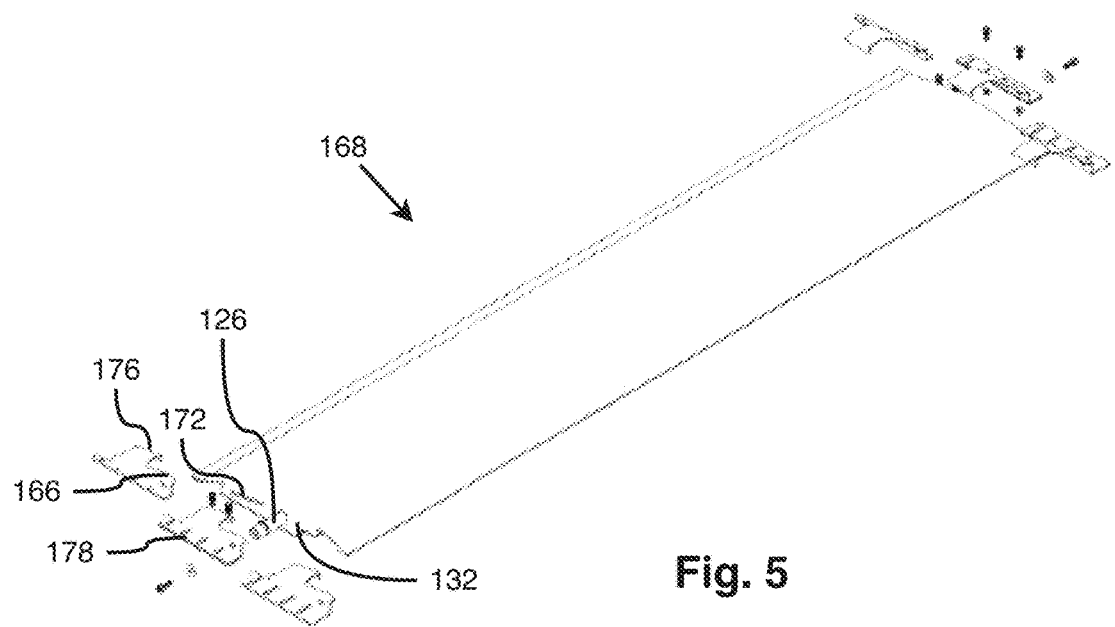
FIG. 5 is an exploded view of the top fairing of FIG. 4 and alternative brackets and securing components depicted.
Figure 6:
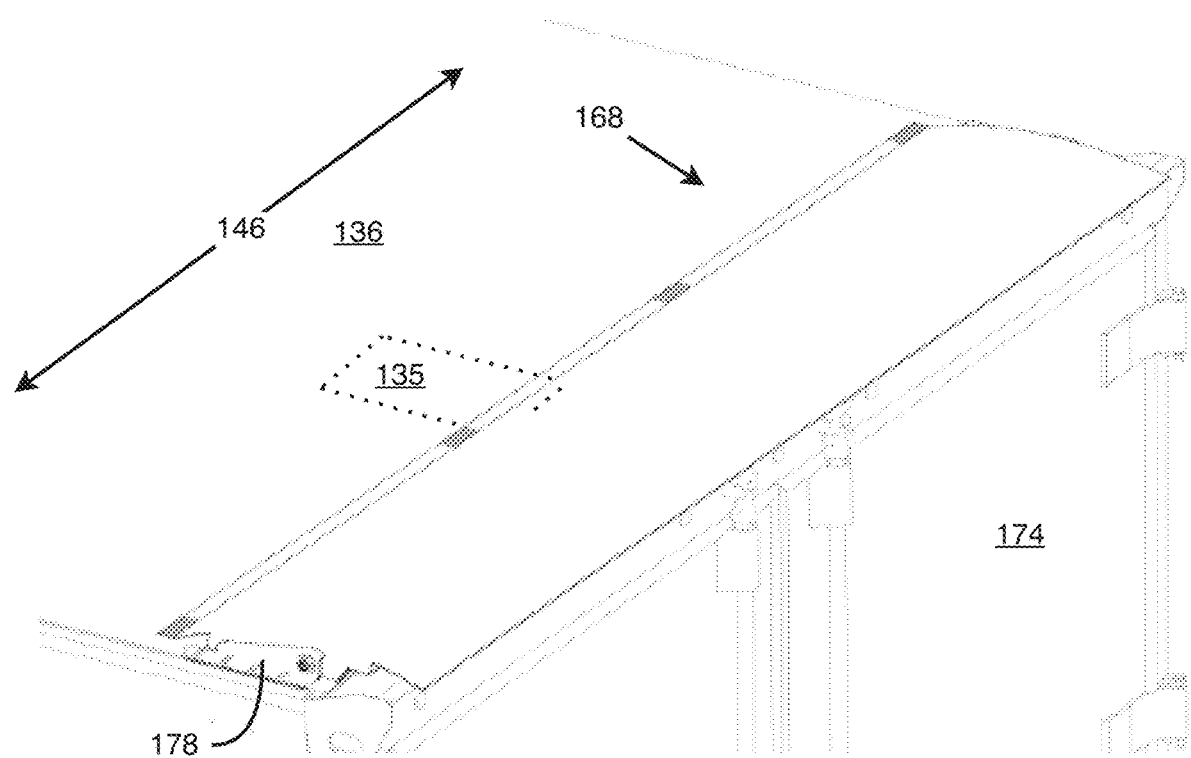
FIG. 6 is a perspective view of the rear top portion of a trailer with a top fairing mounted thereto in accordance with an embodiment.
Figure 10:
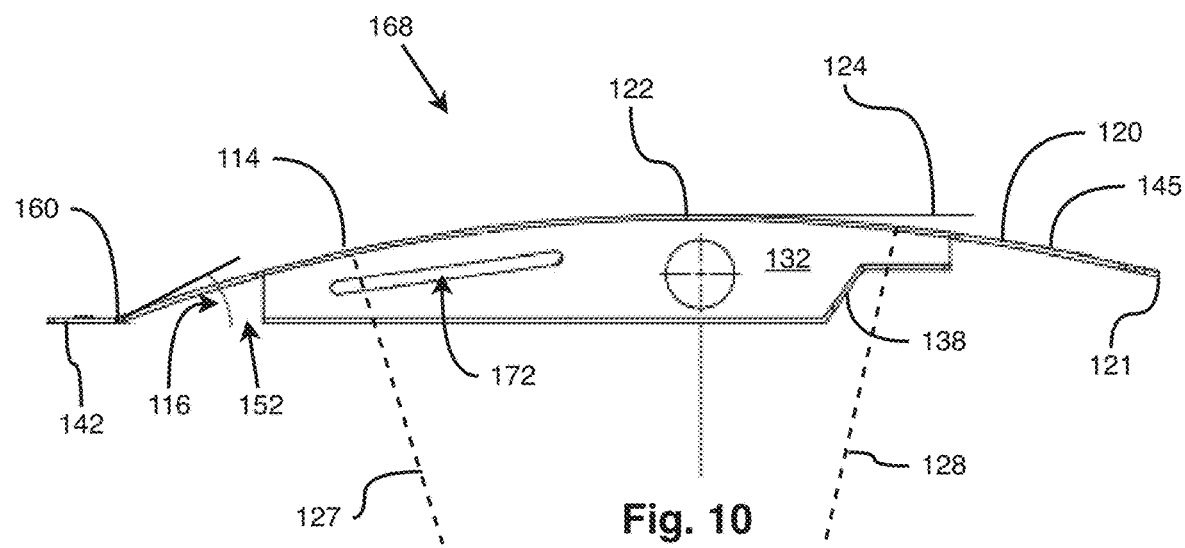
FIG. 10 is a side view of a top fairing in accordance with an embodiment.
Figure 11:
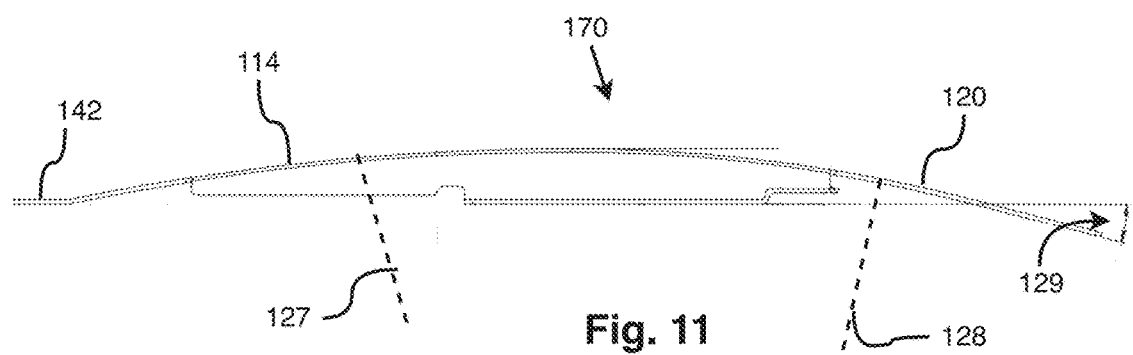
FIG. 11 is a side view of a side fairing in accordance with an embodiment.

Referring to FIGS. 1 to 3, the present invention provides for a fairing 110 a back of the trailer 112 that improves aerodynamic performance of the trailer 112 to reduce drag on the trailer 112 when a truck (not depicted, located at the front of the trailer) is hauling the trailer 112. The fairing 110 comprises a top fairing 168 that is attached to the top surface 136 of the trailer 112, or the fairing 110 may be a side fairing 170 attached to the side surface 134 of the trailer 112. Typically, the trailer 112 is provided with side fairings 170 on both of its side surfaces 134, and with a top fairing 168 on its top surface 136. The fairing 110 features a leading airflow surface 114 that has a leading radius. The leading airflow surface 114 meets a tailing airflow surface 120 at a meeting location 122 (see FIG. 10), and a common tangent line 124 (see FIG. 10) extends through the meeting location 122 and is tangent to both the leading airflow surface 114 and the tailing airflow surface 120 at this point. The fairing 110 is designed for the air to travel over the leading airflow surface 114 and to follow the tailing airflow surface 120 to result in an optimal reduction of drag on resulting from air led to the rear of the trailer 112 during transport.

FIGS. 1 to 3 illustrate a trailer 112 adapted to be hauled by a truck that features at its rear portion fairings 110 in accordance with an exemplary embodiment. The combination of the truck and trailer 112 extends in a longitudinal direction 144 which is the general direction of travel as the truck hauls the trailer 112 forward. The fairings 110 are designed to deflect airflow in an optimal manner around the back of the trailer 112 so that drag on the trailer 112 during travel is optimally reduced. The geometric design of the fairing 110 includes features that result in this optimal reduction of drag. Although three fairings 110 are shown at the back end of the trailer 112, it is to be understood that the trailer 112 may be outfitted with only one or with two of the fairings 110 in other exemplary embodiments. The fairings 110 are preferably located proximate to the terminal end 174 of the trailer 112, secured to the trailer 112, and are forward of the terminal end 174 in the longitudinal direction 144. In some instances, the fairings 110 may extend rearward of the terminal end 174 in the longitudinal direction 144. The fairings 110 are located near the terminal end 174 of the trailer 112 because they are designed to affect the flow of air at the back end of the trailer 112 and behind the trailer 112 during travel. Additional fairings (not shown), not specifically discussed herein, can be employed e.g., at the bottom of the trailer 112 or in other locations on the trailer 112 as desired for combined effect on drag of the trailer 112.

Top Fairing

With additional reference to FIGS. 4 to 10, the top fairing 168 is located at the back end of the trailer 112 so that it is closer to the back terminal end 174 of the trailer 112 than to the front terminal end of the trailer 112. The top fairing 168 may be spaced some amount forward of the back terminal end 174 in the longitudinal direction 144, may terminate right at the back terminal end 174, or may extend slightly rearward from the back terminal end 174 in the longitudinal direction 144. The top fairing 168 extends almost all the way across the top surface 136 in the lateral direction 146 of the trailer 112 so as to extend about both the right and left side surfaces 134. It is contemplated by the present application that the top fairing 168 covers the entire width of the trailer's box, which can reach about between 96" to 100", for instance.

Figure 7:
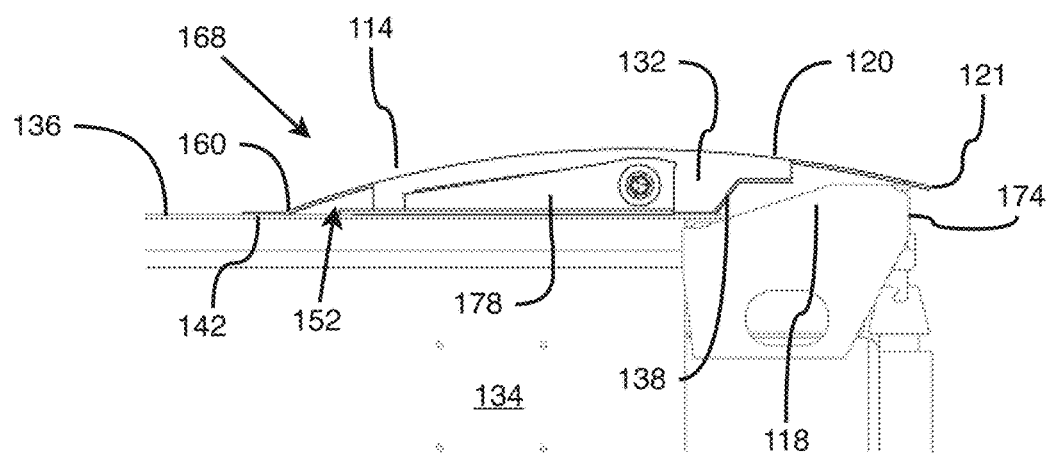
FIG. 7 is a side view of the top fairing of FIG. 6 mounted to the top surface of a trailer comprising a rain gutter.
Figure 8:
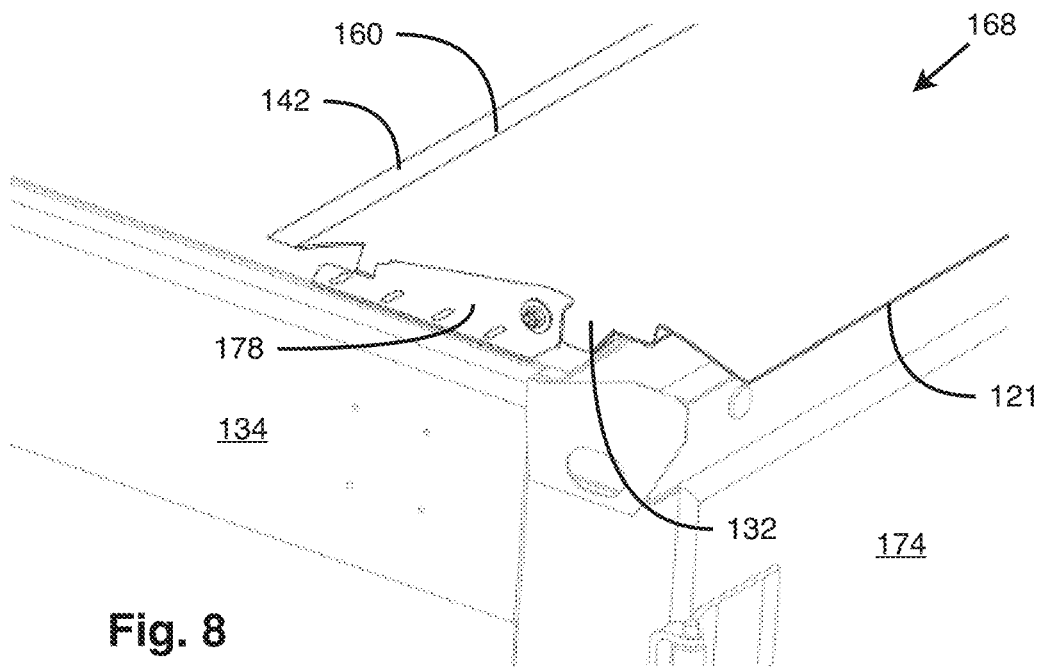
FIGS. 8 and 9 are perspective views of the during its installation, respectively before being mounted to the sides of the trailer and depicting the bracket being secured to the sides of the trailer.
Figure 9:
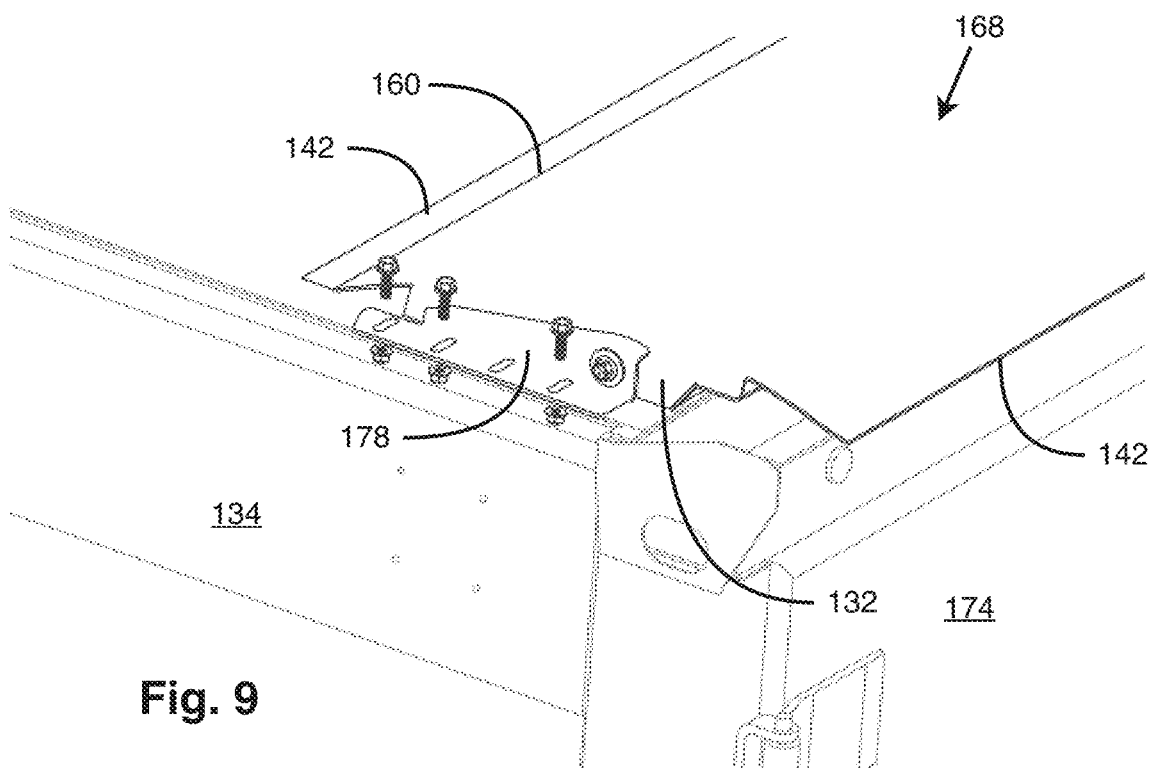

FIG. 7 is a side view of the back end of the trailer 112 with the top fairing 168 positioned onto the top surface 136 of the trailer 112. The top fairing 168 has a leading airflow surface 114 that is forward of a tailing airflow surface 120 in the longitudinal direction 144. The top fairing 168 is typically made of an unibody component mounted to the top surface 136 secured with fixing components to the top surface 136. The leading airflow surface 114 and the tailing airflow surface 120 may be constant or may vary along the width of the top fairing 168. In other words, the leading airflow surface 114 and the tailing airflow surface 120 may be measured according to longitudinal planes (e.g., plane 135, FIG. 6) characterized by their transversal coordinate relative to a reference, e.g., the side edge of the trailer 112. The leading airflow surface 114 and the tailing airflow surface 120 may be constant or vary as they are measured at different transversal coordinates. As such, it is to be understood, as used herein, that the leading airflow surface 114 and the tailing airflow surface 120 discussed herein may be measured according to any transversal coordinate over the width of the top fairing 168. It is further to be understood that as used herein, when discussing the orientation of the surfaces 114, 120 with respect to angles, radii, locations, ranges, etc. the portion of the surfaces 114, 120 that are being measured or discussed are the outer surfaces of the leading airflow surface 114 and the tailing airflow surface 120 and not interior portions, if any, of these surfaces 114, 120. The surfaces 114, 120 can be made of plastic and may be manufactured according to a first embodiment through a thermal plastic forming process, or according to another embodiment made of extruded plastic, the latter being characterized in constant characteristics of the surfaces 114, 120 over the width of the top fairing 168.

The leading airflow surface 114 has a leading edge 160 that is the forward most portion of the leading airflow surface 114 in the longitudinal direction 144. Forward of the leading edge 160 is an anchoring flange 142. The leading airflow surface 114 is oriented, from the anchoring flange 142 parallel to the top surface 136, with a root angle 116 that is typically from 8 to 22 degrees, and more preferably from 12 to 22 degrees, and preferably about 20.7 degrees. The root angle 116 is oriented rearward in the longitudinal direction 144. The root angle 116 is measured relative to the top surface of the anchoring flange 142, itself parallel to the side surface 134. In this regard, an angle of zero (0) degree refer to a surface parallel to the top surface 136, and a root angle 116 that is of one-hundred and eighty (180) degrees refers to a leading airflow surface 114 that would be normal to the top surface 136 at the leading edge 160. The leading airflow surface 114 is curved at a set amount so that the entire leading airflow surface 114 has a single leading radius 127. The leading radius 127 is in the range from 500 millimeters to 900 millimeters. In more preferred embodiments, the leading radius 127 is from 700 millimeters to 800 millimeters, and preferably about 760 millimeters.

The profile includes a front radius, then a radius toward the rear and the last portion, of generally a few inches, is supposed to be flat in some embodiments. The same configuration can be used for the side fairing. The side fairing could include a rear flat portion of about 48 mm, the top fairing can include a rear flat portion of between 0 and 117 mm, depending of the gutter. The leading airflow surface 114 ends at a meeting location 122 where it meets the tailing airflow surface 120. The tailing airflow surface 120 is a curved surface that extends from the meeting location 122 to a tailing edge 121. The tailing edge 121 is about or rearward to the terminal end 174 in the longitudinal direction 144. In the embodiment shown, the tailing airflow surface 120 is curved at a set amount so that the entire tailing airflow surface 120 has a single tailing radius 128. The tailing radius 128 is in the range from 500 millimeters to 1800 millimeters. In more preferred embodiments, the tailing radius 128 is from 800 millimeters to 1600 millimeters, and preferably about 930 millimeters.

The leading airflow surface 114 and the tailing airflow surface 120 are oriented with respect to one another so that they share a common tangent line 124 that is about the apex (i.e., within the top 5% of the height of the top fairing 168, and preferably within the 2.5% of its height) and about the center (i.e. within the range of 30% to 70% of the chord 145 measured from the leading edge 160 to the tailing edge 121, and preferably within the 40% to 60% of the chord 145). The meeting location 122 is the point of engagement between the leading airflow surface 114 and the tailing airflow surface 120 and in so far as the common tangent line 124 is common to both of these surfaces 114, 120. This arrangement affords airflow off of the leading airflow surface 114 to channel against the tailing airflow surface 120 with no disruption. The orientation and leading radius 127 of the leading airflow surface 114 and of the tailing airflow surface 120 results in a geometry of the top fairing 168 that causes an air flow to travel downward over the top fairing 168 around the rear of the trailer 112 to reduce dragging force while the truck is hauling the trailer 112 to improve its fuel efficiency.

The leading air flow surface 114 is spaced from the top surface 136 so that a gap 152 is present and the portion of the top fairing 168 that is below the leading air flow surface 114 is not in engagement with the top surface 136.

The anchoring flange 142 is attached, typically glued with double-face automotive tape, to the top surface 136. According to an embodiment, the anchoring flange 142 is glued over the width of the anchoring flange 142 (from about one side edge to about the other side edge of the top surface 136) with sections of double-sided tape spaced with sections free of tape; the latter providing a gap of the thickness of the double-sided tape for water to flow toward a rain gutter at the rear end of the top surface 136 of the trailer 112.

The installation of the top fairing 168 involves a bar 126 that extends between the top surface 136 and the surfaces 114, 120, and that extends sideways between the side wall 132 of the top fairing 168 to be secured to a mounting bracket 178 at both ends. The bar 126 can extend over the whole width of the top fairing 168, and can be secured to the top fairing 168 at locations to reinforce the top fairing against deformation and/or vibration. The bar 126 can be a separate component from the top fairing 168, or may be permanently assembled to the surfaces 114, 120.

It is to be understood that the bar 126 can be a component that is separate from the leading airflow surface 114 and the tailing airflow surface 120, The bar 126 may be alternatively integral to the top fairing 168. The bar 126 may be a single bar. The bar 126 may alternatively be made of a plurality of bar sections, either or not joined to each other. The bar 126 may be made of the same material than the portion of the top fairing 168 defining the leading airflow surface 114 and the tailing airflow surface 120. The bar 126 may alternatively be made or of a different material than the surfaces 114, 120. Typically, the bar 126 presents more rigidity than the surface 114, 120.

The bar 126 is shown attached to the top surface 136 through the brackets 178 secured to the top of the trailer 112 on opposite sides in the lateral direction 146 (depicted on FIG. 6), and more precisely close enough to the side edges of the trailer 112 to have the bolts securing the brackets 178 to the trailer 112 not penetrating in the interior compartment of the trailer 112. The bar 126 extends through the openings 133 of side walls 132 (opening 133 depicted on FIG. 10 and identified on FIG. 5 with bar 126 extending therethrough) and is secured to brackets 178, and an interface between an extending wing 176 and a slot 172 present in the side walls 132 exerts the anchoring flange 142 downward. A top wing 166 of the brackets 178, presenting itself as an inward folding of a top portion of the brackets 178, complete the interface of the top fairing 168 with the brackets 178. The top wings 166 participate in preventing rotation of the top fairing 168. The described mounting of the top fairing 168 provides some side clearance for transversal adjustment of the top fairing 168. Accordingly, a single bar 126 provides the required strength to attach the top fairing 168 to the top surface 136.

As discussed, the use of the bar 126 allows the side walls 132, and consequently the leading airflow surface 114 and the tailing airflow surface 120, to be secured to the trailer 112 without having to drill holes through the top surface 136, which could result in rain or contaminants entering the compartment of the trailer 112. In this manner, the compartment of the trailer 112 is made more secure by the use of the side-mounted brackets 178 and the bar 126 to retain the top fairing 168 to the trailer 112. Although described as utilizing a single tubular bar 126 to secure the top fairing 168, which provides advantages over alternatives, more than one bar or a bar of another shape may be used in other embodiments.

According to realizations, the tailing air flow surface 120 is adapted for a cantilevered portion to cover a rain gutter located at the rear end of the top surface 136. The tailing airflow surface 120 may be adjusted to adapt rain gutters of different dimensions.

The side walls 132 have a rear edge 138 distant from the tailing edge 121. The rear edge 138 defines a clearance under a cantilevered portion of the tailing surface 120 allowing the top fairing 168 to adapt to top surfaces having no rain gutter and rain gutters 118 of different dimensions, whereby mounting the brackets 178, thus the top fairing 168, farther (for a top surface 136 featuring no rain gutter) or closer (for a top surface 136 featuring a rain gutter 118 of up to e.g., 1⅜ of an inch to have the tailing edge 121 above the rain gutter 118 and reaching the terminal end 174.

According to an embodiment, the rear edge 138 features an upward-rearward slop followed in the direction of the tailing edge 121 by a rearward portion. This shape is adapted to improve clearance while limiting the cantilevered portion of the tailing airflow surface 120 to an acceptable value.

According to a preferred realization, the tailing airflow surface 120 may be marked with indications (not depicted) where to cut the tailing airflow surface 120 based on the dimension of the rain gutter 118 to adapt to.

According to a preferred realization, the meeting location 122, where uplift forces are at their maximum, is within 10% of the total chord 145 from the leading edge 160 to the tailing edge 121 relative to the position in the longitudinal direction of the center of the bar 126. More preferably, it is within 5% relative to the position in the longitudinal direction of the center of the bar 126.

Figure 12:
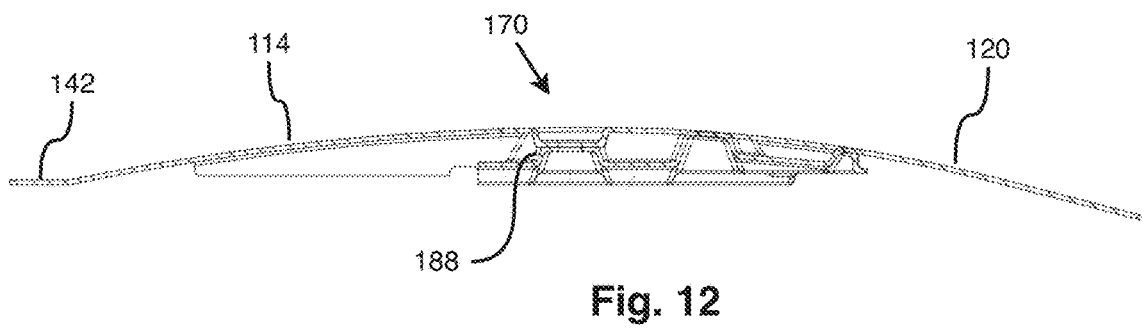
FIG. 12 is a cross-section view according to a transversal plane of the side fairing of FIG. 11 mounted to mounting brackets.
Figure 13:
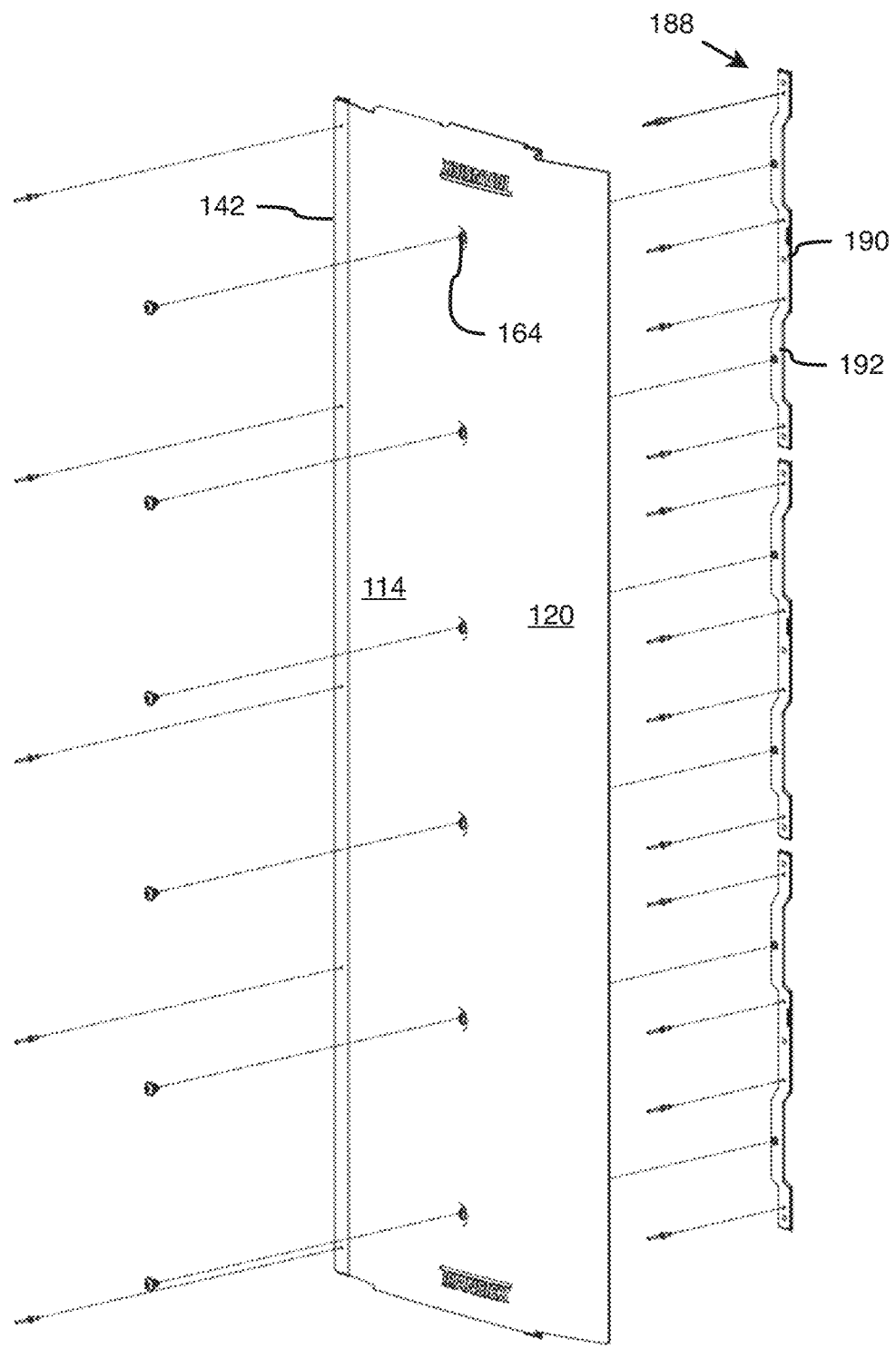
FIG. 13 is an exploded perspective view of a side fairing and mounting brackets associated therewith adapted to install the side fairing to a side surface of the trailer in accordance with an embodiment.
Figure 14:
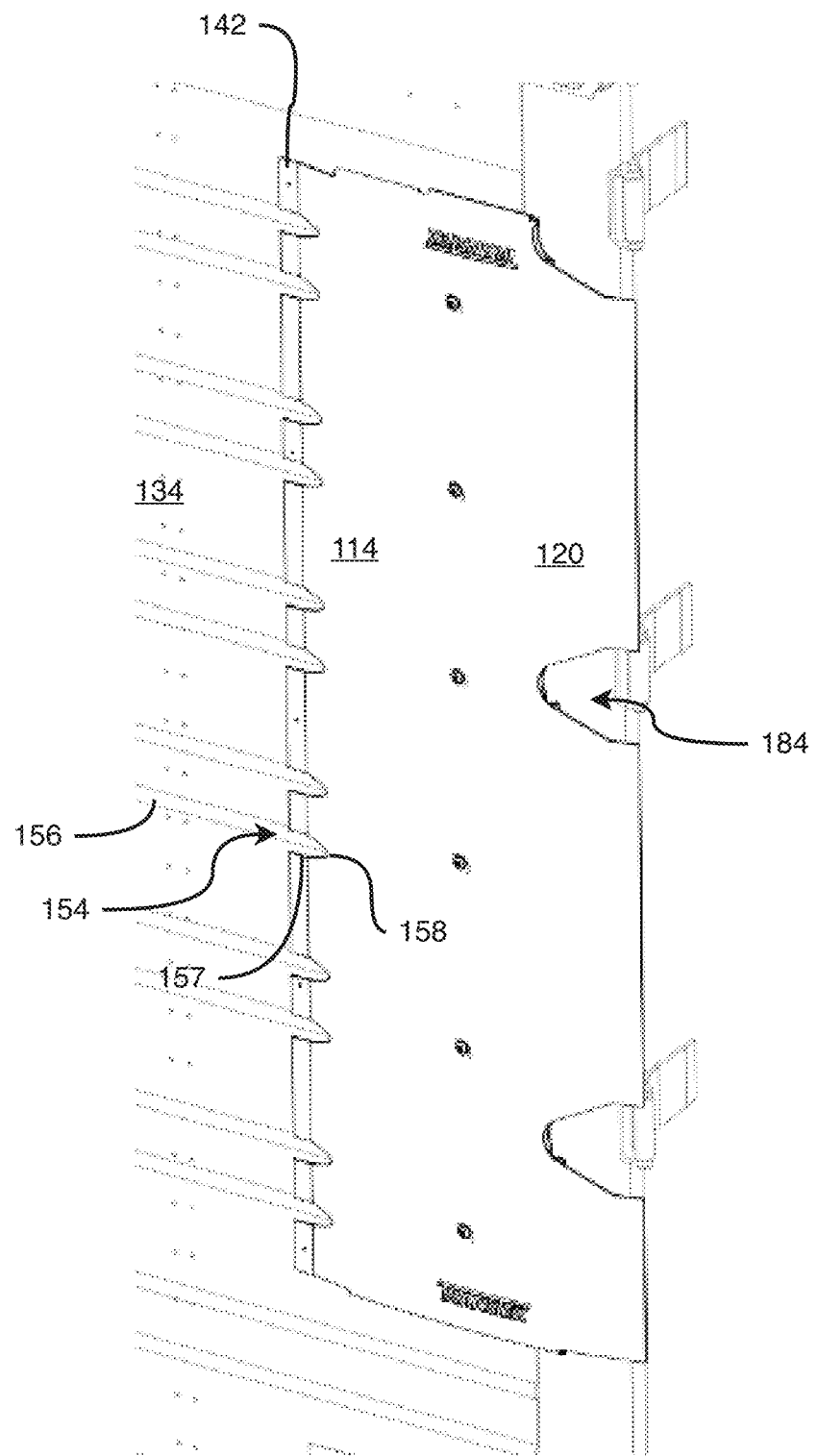
FIG. 14 is a perspective view of an embodiment of a side fairing comprising notches, the side fairing being mounted to the side surface of a trailer comprising corrugations.
Figure 15:
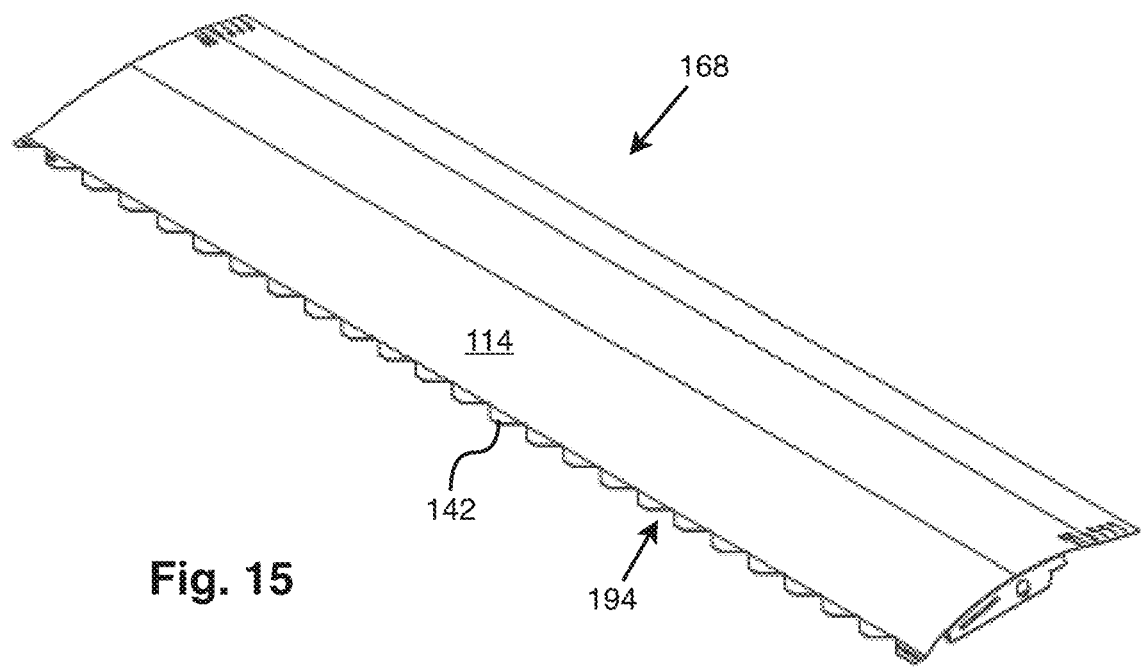
FIGS. 15 and 16 are respectively a perspective view and a close-up view of a front portion of a top fairing showing a single water inlet in accordance with an embodiment.
Figure 16:
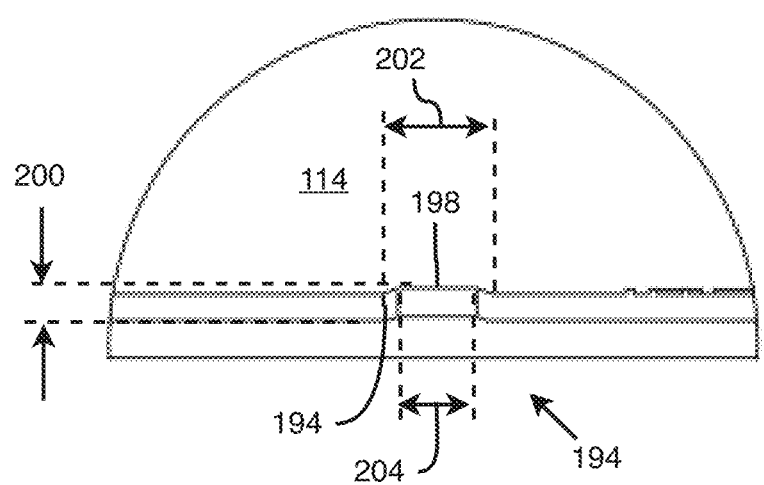
Figure 17:
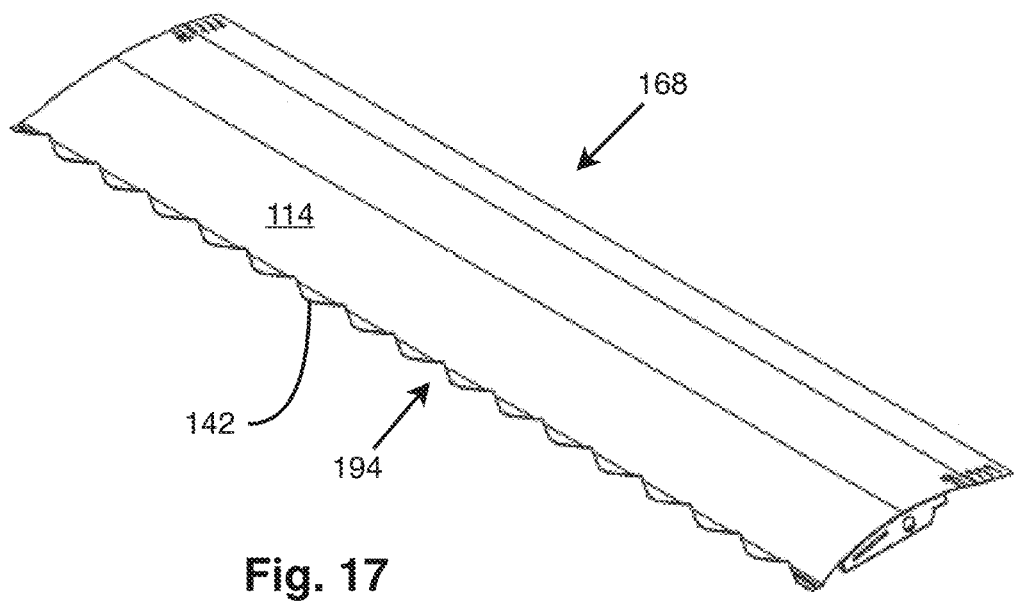
FIGS. 17 and 18 are respectively a perspective view and a close-up view of a front portion of a top fairing showing a single water inlet in accordance with another embodiment.
Figure 18:
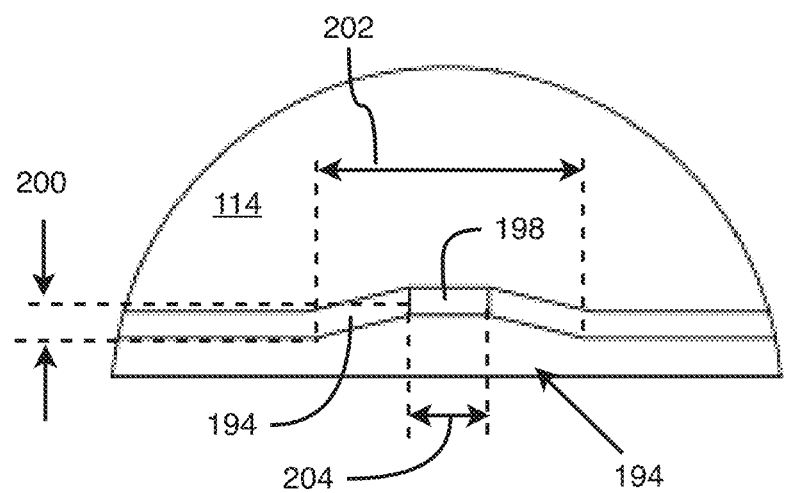
Figure 19:
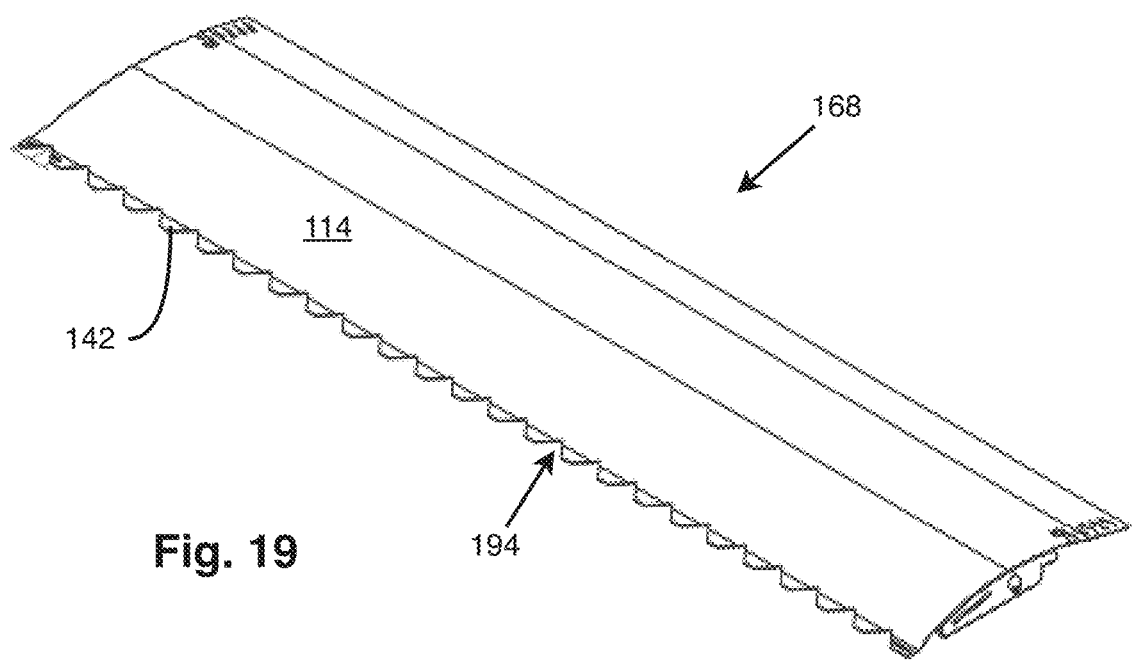
FIGS. 19 and 20 are respectively a perspective view and a close-up view of a front portion of a top fairing showing a single water inlet in accordance with another embodiment.
Figure 20:
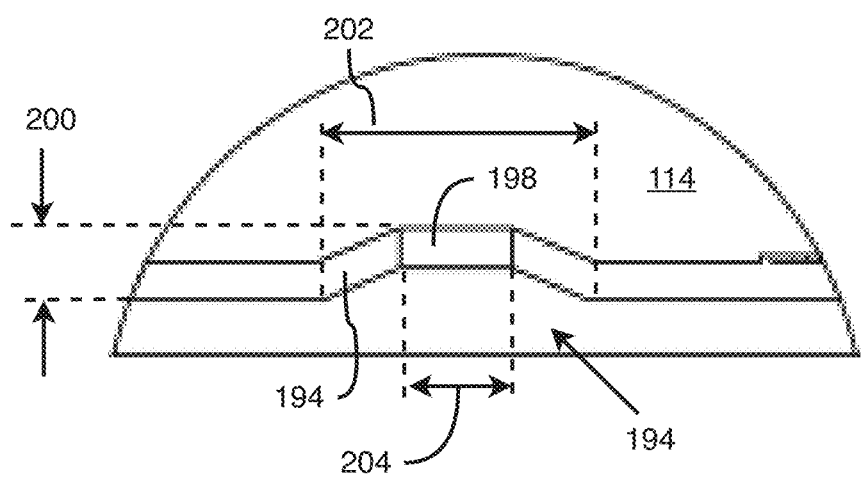
Figure 21:
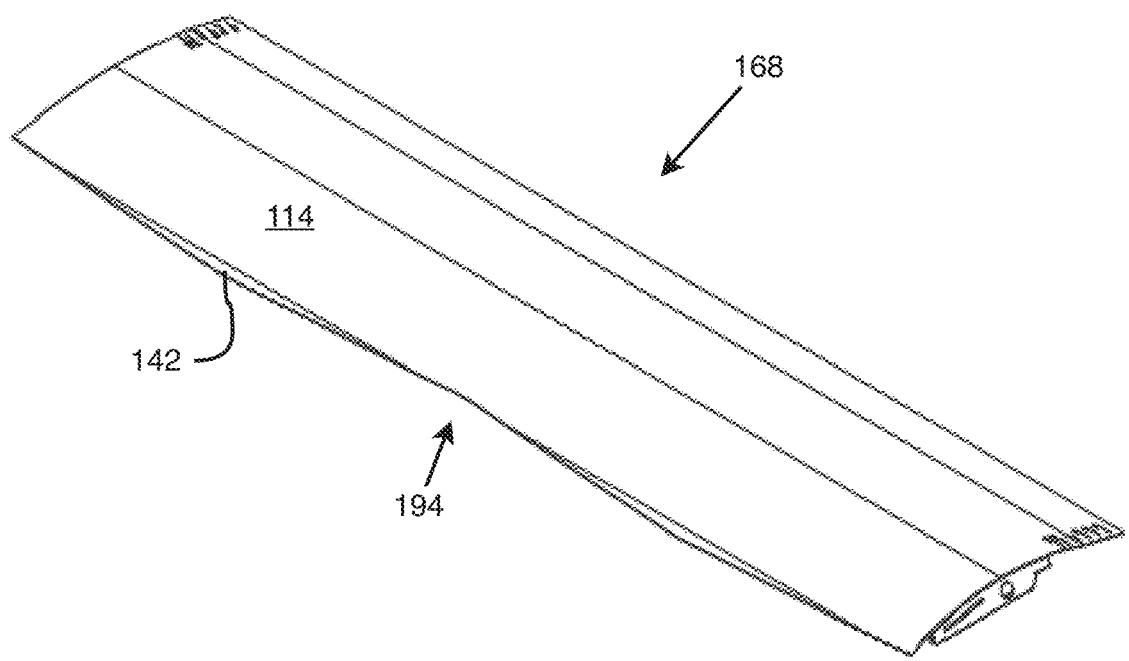
FIG. 21 is a perspective view a top fairing with another embodiment.

The profile of the top fairing 168 may be defined by the parameters of the leading airflow surface 114 and the tailing airflow surface 120, including the root angle, characteristics of their meeting, etc. According to a preferred realization, the root angle 116 is between 8 and 16 degrees, and more preferably between 12 and 16 degrees, and preferably about 14.4 degrees, more preferably about 13.4 degrees. The leading radius 127 is in the range from 500 millimeters to 1800 millimeters. In more preferred embodiments, the leading radius 127 is from 500 to 900 millimeters, and preferably from 700 millimeters to 800 millimeters, and preferably about 760 millimeters. The tailing radius 128 is in the same ranges than the leading radius, and preferably about 900 millimeters. The center of curvature of the leading radius 127 is located under the surfaces 114, 120 and its longitudinal coordinate is within 20% of the chord 145 relative to the meeting location 122, and preferably within 10% of the chord 145 relative to the longitudinal coordinate of the meeting location 122. The center of curvature of the tailing radius 128 is located under the surfaces 114,120 and its longitudinal coordinate is within 20% of the chord 145 relative to the meeting location 122, and preferably within 10% of the chord 145 relative to the longitudinal coordinate of the meeting location 122. The side fairing tailing angle 129 (see FIG. 10 for depiction of the top fairing 168 and FIG. 12 for depiction on the side fairing 170) is between 10 and 30 degrees, and preferably more than 10 degrees, and more preferably more than 12 degrees. The angle of about 11.5 degrees is preferable in some embodiments of the side fairing.

According to another perspective, the ratio of the leading radius 127 over the tailing radius 128 is between 2 over 1 and 1 over 2, preferably between 3 over 2 and 2 over 3, preferably between 4 over 5 and 5 over 4, and preferably about 5 over 6.

Referring now to FIGS. 15 to 21, according to embodiments, top fairings 168 feature an improved water management feature comprising a series of water inlets 194 having a generally funnel-shaped aperture 196 on the anchoring flange 142 extending over the whole depth of the anchoring flange 142 and ending with a e.g., curved opening 198 at the root of the leading airflow surface 114, wherein the opening 198 has small height 200 and a inlet width 204 providing passage for big water drops to travel from in front of the anchoring flange 142 to under the top fairing 168 and finally reaching e.g., a rain gutter. Accordingly, water falling over the top surface 136, instead of accumulating in front of the anchoring flange 142, and travelling over the top fairing 168 and risking falling from the tailing edge 121 at the rear of the trailer 112 on following vehicles, are drained through the rain gutter 118 (see for example FIG. 7).

Embodiments includes top fairings 168 featuring from 3 water inlets 194 (FIG. 21) including two partial water inlets on the sides and a central one, and to more than 30 water inlets 194. According to embodiments, the height 200 of the aperture 196 may vary from about the thickness of the anchoring flange 142 to up to three times the thickness of the anchoring flange 142 with low influence on drag reduction resulting from the use of the top fairing 168. The present disclosure contemplates different shapes (e.g., straight, curved) and width 202 of side walls 195 for the funnel-shaped apertures 196 and spacing between the side walls 195 of neighbor water inlets 194 being null to a ratio of e.g., four time the width 202. The present disclosure further contemplates general shapes of the opening 198 from being either straight or having a curved shape, or another shape appropriate in relation with the material in which the top fairing 168 is made of.

Side Fairing

Referring now to FIGS. 1 to 3 and 11 to 14, the side fairing 170 extends in a vertical direction 148 of the trailer 112 along some, but typically not all, of the vertical height of the trailer 112. The side fairing 170 is typically located closer to the top surface 136 of the trailer 112 than a bottom surface of the trailer 112. The side fairing 170 may be located at the top surface 136, or it may be spaced some distance from the top surface 136 in the vertical direction 148. The side fairing 170 is mounted to the side surface 134 of the trailer 112.

According to an embodiment, the side fairing 170, which function is to direct the flow of air around the side of the trailer 112 and to an area behind the trailer 112 to result in less drag on the trailer 112 when the trailer 112 is hauled by a truck, has an anchoring flange 142 attached to the side surface 134, and a leading airflow surface 114 that joins the anchoring flange 142 farther in the longitudinal direction 144, and a tailing airflow surface 120 that follows the leading airflow surface 114 in the longitudinal direction 144. The leading angle of the side fairing is about 11.5 degrees in some embodiments. The trailing edge of the side fairing is about 14.5 degree in some embodiments.

In some instances, the side surface 134 of the trailer 112 can include corrugations 156 that extend in horizontally in the longitudinal direction 144. The side fairing 170 may be provided with notches 154 having an ogive-like shape having a pair of parallel edges 157 at the anchoring flange 142 leading to a curved apex 158 distant to the anchoring flange 142. The notches 154 are adapted for the corrugations 156 to be disposed therein in order to allow the anchoring flange 142 of the side fairing 170 to marry the flat portion of the side surface 134 between the corrugations 156.

The side fairing 170 has a leading airflow surface 114 and a 120 that have similar characteristics than the ones of the top fairing 168.

According to an embodiment, the radii 127, 128 of the side fairing 170 are respectively of about 1450 millimeters (or 1449 mm) and of about 900 millimeters (or 923 mm).

According to an embodiment, the side fairing 170 is secured to the side surface 134 using a series of mounting brackets 188 having surface-contacting portions 190 and fairing-mounting portions 192 spaced from the side surface 134 such as adapted to provide clearance for corrugations 156 and mounting screw tips. The mounting brackets 188 are adapted for the surface-contacting portions 190 to be secured to the side surface 134 with tape and/or rivets. The side fairing 170 is secured to the fairing-mounting portions 192 with screws.

According to a preferred embodiment, the side fairing 170 features recesses 164 for the head of the screw to not extend, or extend only slightly, over its outer surface 114 or 120.

According to embodiment, the side fairings 170 may be mounted to extend beyond the terminal end 174 of the trailer 112. In some embodiments, hinge notches 184 (of similar shape to the corrugation notches 154) are present to provide clearance for hinges when opening the doors of the trailer 112 without the hinges flexing the side fairings 170.

In is to be noted that the design of the top fairing 168 and the side fairing 170 may differ in that their root angle and their radii. However, it is preferred that profiles for the top fairing 168 and the side fairing 170 remain with the ranges listed herein.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A top fairing for a trailer comprising:
a surface for guiding air thereover, comprising
a flange;
a leading surface having a leading radius, the leading surface being joined to the flange and extending in a rearward direction; and
a tailing surface having a tailing radius, the tailing surface in continuity to the leading surface in the rearward direction;
and
openings disposed in the flange for managing water through the flange.

2. The top fairing of claim 1, wherein the flange and the leading surface are joining each other with a root angle of between 8 degrees and 16 degrees.

3. The top fairing of claim 1, wherein the flange is a serrated flange.

4. The top fairing of claim 1, wherein the flange has a depth perpendicular to its longitudinal orientation, and wherein the openings have funnel-shape walls extending through full depth of the flange.

5. The top fairing of claim 1, wherein the openings extend into the leading surface.

6. The top fairing of claim 1, wherein flange has a thickness, and the openings have a height greater than the flange.

7. The top fairing of claim 1, wherein the tailing surface comprises a cantilever portion.

8. The top fairing of claim 7, comprising a support structure, and wherein the cantilever portion is rearward from the support structure.

9. The top fairing of claim 7, wherein the top fairing comprises a bridge portion frontward from the cantilever portion, wherein the bridge portion has clearance under while providing support to the tailing surface.

10. The top fairing of claim 1, further comprises
side walls each comprising a bar opening and a slot distinct from the bar openings;
a bar extending through the side walls; and
a pair of brackets to be mounted to a top surface of the trailer, each one of the brackets being adapted to be secured to an extremity of the bar that is extending through the side walls, and each one of the brackets comprising a wing interfacing with the slot distant from the bar to secure the top fairing against rotation.

11. The top fairing of claim 10, wherein the brackets are adapted to be secured to corner members of the trailer.

12. The top fairing of claim 10, wherein the bar has a transversal coordinate according to its axis, wherein the top fairing has a chord length measured from a leading edge of the leading surface to a tailing edge of the tailing surface, wherein the leading surface and the tailing surface join with each other at a meeting location, and wherein transversal coordinates of the meeting location and of the bar are within 10% of the chord length from each other.

13. The top fairing of claim 1, wherein the top fairing has a chord length measured from a leading edge of the leading surface to a tailing
edge of the tailing surface, wherein the leading surface and the tailing surface join with each other at a meeting location, and transversal coordinates of center of curvature of the leading radius, of center of curvature of the tailing radius and of meeting location are within 20% of the chord length from each other.

14. A trailer with fairing comprising a fairing adapted to manage water in accordance with claim 1.

15. The trailer with fairing of claim 14, wherein the fairing comprises side fairing mounted to side surfaces of the trailer.

16. The trailer with fairing of claim 15, wherein the side surfaces comprise corrugations, and wherein each one of the side fairings comprises a side-fairing flange, a side-fairing leading surface, and notches extending into the side-fairing flange and the side fairing leading surface, wherein the notches provide clearance for the corrugations to fill when the flange abuts the side surface of the trailer.

17. A fairing kit for decreasing drag of a trailer, comprising a top fairing in accordance with claim 1, and a pair of top-fairing brackets adapted to mount the top fairing to a top surface of the trailer.

18. The fairing kit of claim 17, further comprising side fairings and side-fairing brackets adapted to mount the side fairings to side surfaces of the trailer.

19. The fairing kit of claim 18, wherein the side fairing brackets comprise a surface-contacting portion adapted to abut the side surfaces, and a fairing-mounting portion adapted for the side fairings to be mounted thereto, wherein the fairing mounting portion is adapted to be distant from the side surfaces.

* * * * *